E. L. SHIVERS.
NUT.
APPLICATION FILED SEPT. 4, 1912.

1,086,944.

Patented Feb. 10, 1914.

Witnesses
Carroll Bailey.
Wm J Koerth

Inventor
E. L. Shivers,
By Victor J. Evans
Attorney

UNITED STATES PATENT OFFICE.

ELIJAH L. SHIVERS, OF CRAWFORDSVILLE, ARKANSAS.

NUT.

1,086,944.

Specification of Letters Patent.

Patented Feb. 10, 1914.

Application filed September 4, 1912. Serial No. 718,503.

*To all whom it may concern:*

Be it known that I, ELIJAH L. SHIVERS, a citizen of the United States, residing at Crawfordsville, in the county of Crittenden and State of Arkansas, have invented new and useful Improvements in Nuts, of which the following is a specification.

This invention relates to improvements in nuts primarily intended for use upon axle spindles.

The primary object of this invention is to provide a nut having means whereby the same may be easily and quickly locked upon the extremity of the spindle, or easily and quickly removed therefrom when desired.

With the above object in view, the invention resides in the construction, combination and arrangement of parts hereinafter fully described and claimed.

Figure 1:
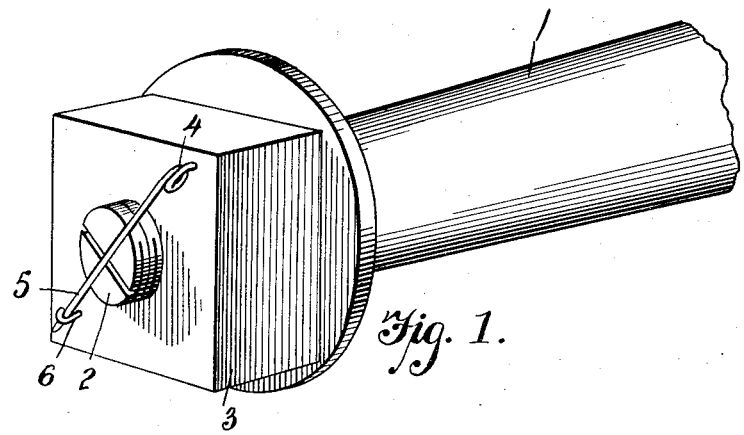
Figure 2:
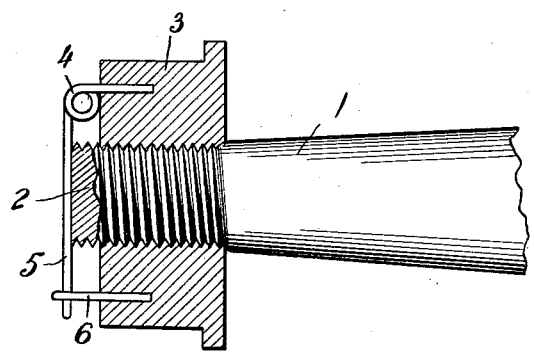

In the drawings: Figure 1 is a perspective view of a nut constructed in accordance with the present invention and showing the same locked upon the bolt. Fig. 2 is a sectional view through the nut taken in a plane with that of the spring lock showing a portion of the bolt in section.

Referring now to the drawings in detail, the numeral 1 designates a carriage spindle, and 2 the threaded extremity thereof. The extremity of the spindle is formed on its end with a plurality of grooves or pockets, the same extending across the entire end face of the threaded member.

The numeral 3 designates my improvement. This nut is of the ordinary construction having a threaded bore which is adapted to engage with the threaded portion of the spindle or bolt, and the said nut is provided with a spring finger arranged tangentially of its bore and adjacent one of its corners. The spring member is constructed of a single piece of material and is connected with the nut in any desired or preferred manner. The spring element is preferably formed with a coil adjacent its point of connection with the nut as designated by the numeral 4, while its locking arm 5 extends across the bore of the nut and terminates diagonally opposite the corner of the nut to that to which it is connected.

The numeral 6 designates a suitable hook which is adapted to receive the extremity of the locking arm of the spring element, and when the nut is screwed home upon the bolt or upon the threaded spindle, the locking arm 5 is adapted to engage in one of the grooves or pockets provided in the face of the said threaded element.

From the above description taken in connection with the accompanying drawings, the simplicity of the device as well as the advantages thereof will, it is thought, be apparent to those skilled in the art to which such inventions appertain.

Having thus described the invention what I claim is:—

In a nut lock, a threaded member having a slitted end, a nut, and a nut locking device provided upon the face of the nut, said locking device comprising a resilient element which has one of its ends secured to the nut adjacent one of the corners of the nut, the element at its connection with the nut being provided with a coil which is adapted to add to the resiliency of the element and to permit of its free arm swinging outwardly of the nut, the said nut having its corner diametrically opposite to that to which the spring lock is attached provided with a hook, and the arm of the spring being adapted to be sprung to within one of the grooves at the end of the threaded member and to engage with and be retained by the hook.

In testimony whereof I affix my signature in presence of two witnesses.

ELIJAH L. SHIVERS.

Witnesses:
 WILLIAM A. GREENE,
 CHURCH STALLINGS.

Copies of this patent may be obtained for five cents each, by addressing the "Commissioner of Patents, Washington, D. C."